United States Patent
Behrens

(10) Patent No.: US 9,930,428 B2
(45) Date of Patent: Mar. 27, 2018

(54) INDIVIDUALIZATION OF MIGRATION BETWEEN TELEPHONY SYSTEMS

(71) Applicant: InnerWireless, Inc., Richardson, TX (US)

(72) Inventor: Dennis J. Behrens, Solon, OH (US)

(73) Assignee: INNERWIRELESS, INC., Richardson, TX (US)

( * ) Notice: Subject to any disclaimer, the term of this patent is extended or adjusted under 35 U.S.C. 154(b) by 88 days.

(21) Appl. No.: 15/138,334

(22) Filed: Apr. 26, 2016

(65) Prior Publication Data

US 2017/0311052 A1    Oct. 26, 2017

(51) Int. Cl.
| | |
|---|---|
| *H04M 7/00* | (2006.01) |
| *H04L 12/66* | (2006.01) |
| *H04Q 3/00* | (2006.01) |
| *H04L 12/24* | (2006.01) |
| *H04M 3/24* | (2006.01) |
| *H04M 3/22* | (2006.01) |

(52) U.S. Cl.
CPC ....... *H04Q 3/0062* (2013.01); *H04L 41/5074* (2013.01); *H04M 3/2263* (2013.01); *H04M 3/24* (2013.01)

(58) Field of Classification Search
CPC .......................... H04Q 3/0062; H04L 41/5074
USPC .............................. 379/224, 221.13; 370/352
See application file for complete search history.

(56) References Cited

U.S. PATENT DOCUMENTS

| | | | | |
|---|---|---|---|---|
| 5,048,081 A | * | 9/1991 | Gavaras | H04L 45/00 370/352 |
| 6,151,503 A | * | 11/2000 | Chavez | H04W 4/16 455/417 |
| 7,415,591 B1 | * | 8/2008 | Todd | G06F 3/0614 711/165 |

(Continued)

OTHER PUBLICATIONS

"Summon Up Your and the Industry's Best Engineering Practices", Kurmi Software, Retrieved Date: Apr. 21, 2016, Retrieved at: <<http://www.kurmi-software.com/products/sunrise/>>, 3 pages.

(Continued)

*Primary Examiner* — William Deane, Jr.
(74) *Attorney, Agent, or Firm* — Medley, Behrens & Lewis, LLC

(57) ABSTRACT

Various technologies described herein pertain to controlling migration of a source endpoint in a source telephony system to a destination endpoint in a destination telephony system. The source endpoint is deactivated and the destination endpoint is activated as part of the migration. The migration of endpoints between the source telephony system and the destination telephony system can be performed in an individualized manner. Source information that specifies a state of the source endpoint is retrieved from the source telephony system and destination information that specifies a state of the destination endpoint is retrieved from the destination telephony system. Moreover, a validation is performed concerning whether the source endpoint is migratable to the destination endpoint based on the source information and the destination information. Subsequent to validating that the source endpoint is migratable to the destination endpoint, the migration is performed to deactivate the source endpoint and activate the destination endpoint.

21 Claims, 11 Drawing Sheets

(56) References Cited

U.S. PATENT DOCUMENTS

| | | | | |
|---|---|---|---|---|
| 7,751,549 B1* | 7/2010 | Dianda | H04Q 3/005 | |
| | | | 379/221.13 | |
| 8,370,592 B1* | 2/2013 | Specht | G06F 11/3034 | |
| | | | 707/661 | |
| 8,433,371 B2* | 4/2013 | Silver | H04L 12/66 | |
| | | | 370/352 | |
| 8,948,367 B2* | 2/2015 | Wnuck | H04M 3/12 | |
| | | | 379/220.01 | |
| 2004/0042509 A1* | 3/2004 | Gallant | H04J 3/12 | |
| | | | 370/522 | |
| 2004/0146147 A1* | 7/2004 | Picard | H04M 3/53325 | |
| | | | 379/88.22 | |
| 2006/0109972 A1* | 5/2006 | Yeh | H04Q 3/0025 | |
| | | | 379/221.1 | |
| 2007/0011209 A1* | 1/2007 | Wietlisbach | G06F 9/44505 | |
| 2007/0083562 A1* | 4/2007 | DelGaudio | G06Q 10/06 | |
| 2007/0087730 A1* | 4/2007 | Diroo | H04L 29/06027 | |
| | | | 455/413 | |
| 2008/0112387 A1* | 5/2008 | Gandham | H04L 12/1881 | |
| | | | 370/345 | |
| 2008/0279360 A1* | 11/2008 | Veenstra | H04M 3/54 | |
| | | | 379/211.02 | |
| 2009/0310756 A1* | 12/2009 | Brugman | H04M 3/30 | |
| | | | 379/27.02 | |
| 2009/0310767 A1* | 12/2009 | Wang | H04M 3/42144 | |
| | | | 379/201.02 | |
| 2010/0017800 A1* | 1/2010 | Dow | G06F 9/45533 | |
| | | | 718/1 | |
| 2010/0111268 A1* | 5/2010 | Brugman | H04L 43/0811 | |
| | | | 379/1.03 | |
| 2010/0135280 A1* | 6/2010 | Ikegami | H04M 3/42068 | |
| | | | 370/352 | |
| 2012/0163577 A1* | 6/2012 | Buford | H04L 12/1822 | |
| | | | 379/202.01 | |
| 2012/0254326 A1* | 10/2012 | Bellan | H04L 61/2575 | |
| | | | 709/206 | |
| 2013/0084876 A1* | 4/2013 | Tran | H04Q 3/005 | |
| | | | 455/445 | |
| 2013/0326072 A1* | 12/2013 | Smyth | H04L 67/141 | |
| | | | 709/227 | |
| 2014/0032774 A1* | 1/2014 | Lowekamp | H04L 67/08 | |
| | | | 709/230 | |
| 2014/0359457 A1* | 12/2014 | Bellan | H04L 41/22 | |
| | | | 715/736 | |
| 2015/0149643 A1* | 5/2015 | Hu | H04L 41/0893 | |
| | | | 709/227 | |
| 2015/0234910 A1* | 8/2015 | Schiff | G06Q 10/20 | |
| | | | 707/634 | |
| 2016/0205712 A1* | 7/2016 | Rayanki | H04W 76/023 | |
| | | | 370/329 | |
| 2017/0149687 A1* | 5/2017 | Udupi | H04L 47/78 | |

OTHER PUBLICATIONS

"Kurmi Unified Provisioning—Part 1", Youtube.com, Retrieved Date: Apr. 21, 2016, Retrieved at: <<https://www.youtube.com/watch?v=bowAnSykUpo&feature=youtu.be>>, 2 pages.

"Welcome to Unimax", Unimax—Telecommunications Configuration Management Software, Retrieved Date: Apr. 21, 2016, Retrieved at: <<http://www.unimax.com/>>, 2 pages.

"Single Pane of Glass Management of Cisco and Microsoft UC Services-On-Premise, Cloud, Hybrid", VOSS Unified Communications Management, Retrieved Date: Apr. 21, 2016, Retrieved at: <<http://www.voss-solutions.com/>>, 7 pages.

"Cisco UC & Collaboration Provisioning", Akkadian Provisioning Manager Express, Retrieved Date: Apr. 21, 2016, Retrieved at: <<http://www.akkadianlabs.com/apme/>>, 5 pages.

"Provisioning System for Cisco Unified Communications", Uplinx Software, Retrieved Date: Apr. 21, 2016, Retrieved at: <<https://www.uplinx.com/provisioningsystem/>>, 5 pages.

"Zero Touch Auto Provisioning for Cisco CUCM", Uplinx Software, Retrieved Date: Apr. 21, 2016, Retrieved at: <<https://www.uplinx.com/autoprovisioning/>>, 5 pages.

"TAPS—Tool for Automated Provisioning System", VoIP Integration, Retrieved Date: Apr. 21, 2016, Retrieved at: <<http://www.voipintegration.com/Software/Tool-For-Automated-Provisioning-System/>>, 2 pages.

* cited by examiner

INDIVIDUALIZATION OF MIGRATION BETWEEN TELEPHONY SYSTEMS

BACKGROUND

It is oftentimes desirable to transition from a source telephony system to a destination telephony system. Various conventional approaches are utilized to transition from a source telephony system to a destination telephony system. Examples of such approaches for transitioning between telephony systems include a flash cut and a migration.

A flash cut refers to an immediate change in a system, with no phase-in period. As part of a flash cut, the transition from the source telephony system to the destination telephony system can occur in one event, with no phase-in period. Prior to the transition, the destination telephony system can be configured and made ready; however, the destination telephony system is not integrated with the source telephony system as part of the flash cut. Rather, the flash cut transitions users and services from the source telephony system to the destination telephony system in one event.

In contrast to a flash cut, a migration involves transitioning users and services from the source telephony system to the destination telephony system in multiple events. Prior to the transition, the destination telephony system can again be configured and made ready. The destination telephony system can further be integrated with the source telephony system. The migration involves coordinated transitioning of users and services in multiple events from the source telephony system to the destination telephony system.

The following is an example of a conventional migration between telephony systems. Typically, the destination telephony system can be designed, configured, and made ready. Thereafter, the source telephony system and the destination telephony system can be integrated together. Then, users and/or endpoints can be migrated from the source telephony system to the destination telephony system, and carrier circuits and/or phone numbers can be migrated to the destination telephony system (e.g., the users and/or endpoints and the carrier circuits and/or phone numbers can be migrated in parallel, the users and/or endpoints can be migrated during differing time periods as compared to the migration of the carrier circuits and/or phone numbers). Migration of users and/or endpoints from the source telephony system to the destination telephony system is typically performed in batches. Thereafter, the source telephony system can be decommissioned.

SUMMARY

Described herein are various technologies that pertain to controlling migration of a source endpoint in a source telephony system to a destination endpoint in a destination telephony system. The migration of endpoints between the source telephony system and the destination telephony system can be performed in an individualized manner. Thus, a first source endpoint in the source telephony system can be migrated to a first destination endpoint in the destination telephony system during a first event, a second source endpoint in the source telephony system can be migrated to a second destination endpoint in the destination telephony system during a second event, and so forth. The events can occur during differing time periods and/or can be initiated by differing computing devices, for instance. In contrast, conventional migration approaches typically migrate a plurality of endpoints between the telephony systems in each batch.

More particularly, the individualized migration can be controlled as follows. Source information from the source telephony system can be retrieved based on a source indicator. The source information can specify a state of the source endpoint in the source telephony system. Moreover, destination information can be retrieved from the destination telephony system based on a destination indicator. The destination information can specify a state of the destination endpoint in the destination telephony system. It is contemplated that the source indicator and the destination indicator can be the same indicator or differing indicators. A validation can be performed concerning whether the source endpoint in the source telephony system is migratable to the destination endpoint in the destination telephony system based on the source information and the destination information. Subsequent to validating that the source endpoint in the source telephony system is migratable to the destination endpoint in the destination telephony system, the migration of the source endpoint in the source telephony system to the destination endpoint in the destination telephony system can be performed. The source endpoint in the source telephony system can be activated prior to the migration and deactivated subsequent to the migration. Further, the destination endpoint in the destination telephony system can be provisioned and non-active prior to the migration and activated subsequent to the migration.

According to various embodiments, a client computing device can operate in conjunction with a computing system (e.g., a server computing system) to cause the migration of the source endpoint in the source telephone system to the destination endpoint in the destination telephony system. Responsive to receipt of a first user input at the client computing device, an indicator can be transmitted to the computing system. The indicator can be based on the first user input. Moreover, the indicator can pertain to the source endpoint and/or the destination endpoint (e.g., the indicator can be or include a source indicator and/or a destination indicator). The source information and the destination information can be retrieved by the computing system based on the indicator. The computing system can further perform the validation concerning whether the source endpoint is migratable to the destination endpoint. Validation information that specifies whether the source endpoint in the source telephony system is validated to be migratable to the destination endpoint in the destination telephony system can be transmitted from the computing system and received by the client computing device. The client computing device can further cause the validation information to be displayed on a display screen. When and only when the validation information specifies that the source endpoint is validated to be migratable to the destination endpoint, responsive to receipt of a second user input at the client computing device, a command can be transmitted to the computing system. The command can cause the computing system to perform the migration of the source endpoint in the source telephony system to the destination endpoint in the destination telephony system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
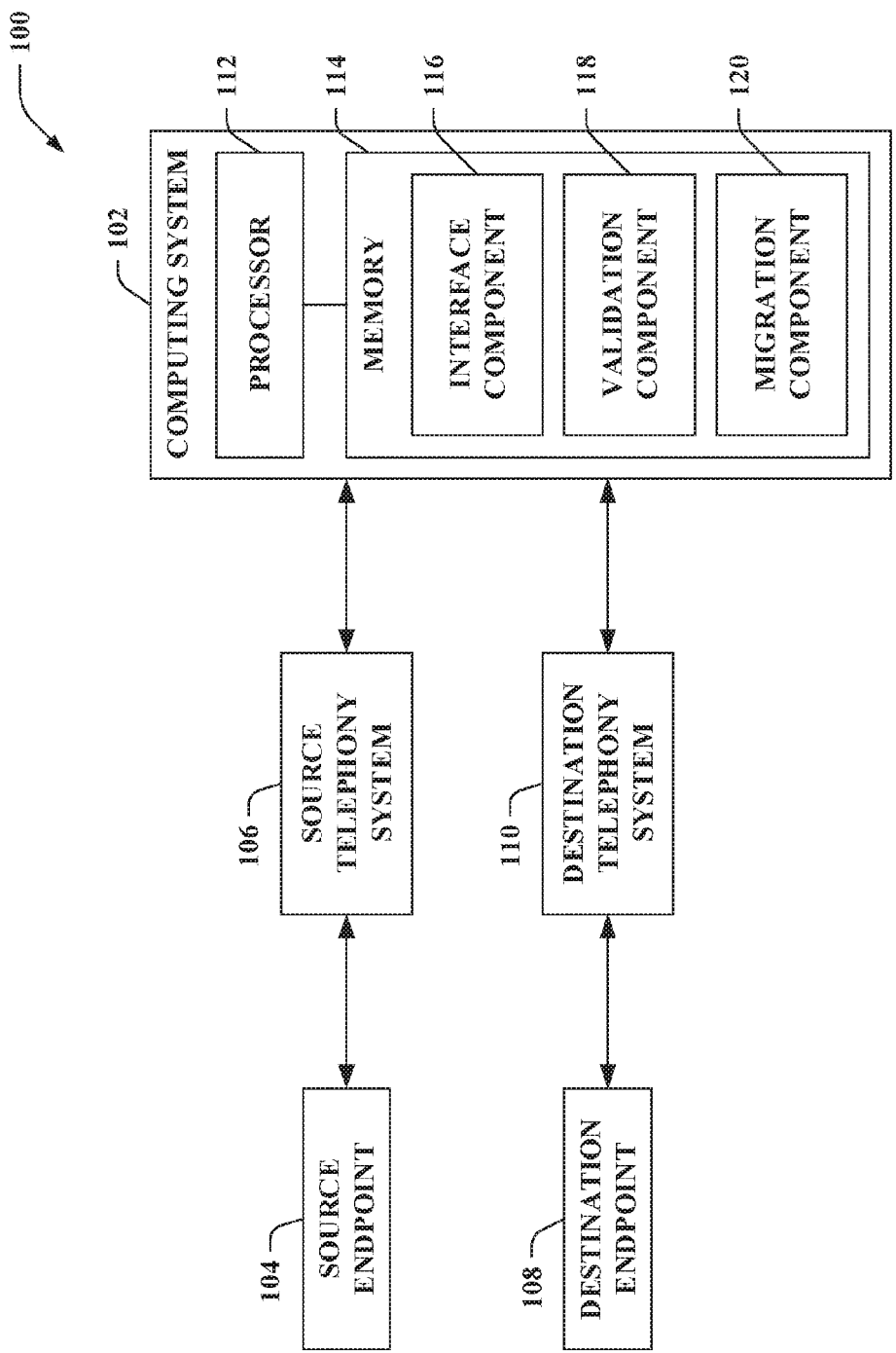
FIG. 1 illustrates a functional block diagram of an exemplary system that supports individualized migration between telephony systems.

Various technologies pertaining to individualized migration of endpoints between telephony systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that supports individualized migration between telephony systems. The system 100 includes a computing system 102 that controls a migration of a source endpoint 104 in a source telephony system 106 to a destination endpoint 108 in a destination telephony system 110. The computing system 102 includes at least one processor 112 and memory 114. The processor 112 is configured to execute instructions loaded into the memory 114 (e.g., one or more systems loaded into the memory 114 are executable by the processor 112, one or more components loaded into the memory 114 are executable by the processor 112). As described in greater detail herein, the memory 114 includes instructions executable by the processor 112 for validating whether the source endpoint 104 is migratable to the destination endpoint 108. Moreover, the memory 114 includes instructions executable by the processor 112 for performing the migration of the source endpoint 104 to the destination endpoint 108 when the source endpoint 104 is validated to be migratable to the destination endpoint 108.

The computing system 102 can be or include one or more server computing devices. For instance, the computing system 102 can be or include one or more data centers, where a data center includes a plurality of server computing devices. Additionally or alternatively, the computing system 102 can be a distributed computing system. Moreover, in accordance with various examples, the computing system 102 can support cloud computing.

While many of the examples set forth herein describe the computing system 102 being or including server computing device(s), it is contemplated that other implementations of the computing system 102 are intended to fall within the scope of the hereto appended claims. For instance, pursuant to other examples, the computing system 102 can be or include a network appliance. The network appliance can be a device, such as a router, a switch, or other type of intelligent device, which is part of a network for the destination telephony system 110. It is also contemplated that the network appliance can additionally or alternatively be part of a network for the source telephony system 106. According to other examples, the computing system 102 can be or include a computing device. The computing device can be a mobile computing device (e.g., a laptop computing device, a tablet computing device, a mobile telephone, a smartphone, a handheld computing device, a wearable computing device, a personal digital assistant), a desktop computing device, or the like. In accordance with an illustration, the computing device can be part of a peer-to-peer network, where computing devices in such peer-to-peer network control validation and performance of migration as described herein.

Any types of endpoints (e.g., a type of the source endpoint 104, a type of the destination endpoint 108) are intended to fall within the scope of the hereto appended claims. Examples of endpoint types include analog gateways, Internet Protocol (IP) phones, digital phones, software-based endpoints (e.g., executable by processors of computing devices upon which the software-based endpoints are installed), wireless endpoints, conference stations, video endpoints, and so forth. A software-based endpoint, for instance, can also be a mobile endpoint. Moreover, it is to be appreciated that the type of the source endpoint 104 may, but need not, match the type of the destination endpoint 108 (e.g., the source endpoint 104 and the destination endpoint 108 can be the same type of endpoint, the source endpoint 104 and the destination endpoint 108 can be differing types of endpoints).

The computing system 102 can support individualized migration between substantially any types of telephony systems. A modular design can be implemented, where the validation and the migration performed by the computing system 102 are dependent upon a type of the source telephony system 106 and a type of the destination telephony system 110. Accordingly, when configuring the computing system 102 for controlling individualized migrations between the source telephony system 106 and the destination telephony system 110, the source telephony system 106 can be selected from a plurality of supported source telephony systems and the destination telephony system 110 can be selected from a plurality of supported destination telephony systems. Accordingly, the validation and the migration performed by the computing system 102 are tailored as a function of the selected type of the source telephony system 106 and the selected type of the destination telephony system 110.

The migration of endpoints between the source telephony system 106 and the destination telephony system 110 can be performed in an individualized manner. Thus, a first source endpoint (e.g., the source endpoint 104) in the source telephony system 106 can be migrated to a first destination endpoint (e.g., the destination endpoint 108) in the destination telephony system 110 during a first event, a second source endpoint (e.g., a differing source endpoint other than the source endpoint 104) in the source telephony system 106 can be migrated to a second destination endpoint (e.g., a differing destination endpoint other than the destination endpoint 108) in the destination telephony system 110 during a second event, and so forth. The events can occur during differing time periods and/or can be initiated by differing computing devices (e.g., differing client computing devices, differing destination endpoints), for instance. In contrast, conventional migration approaches typically migrate a plurality of endpoints between the telephony systems in each batch.

The memory 114 includes an interface component 116 configured to retrieve information from the source telephony system 106 and the destination telephony system 110. More particularly, the interface component 116 can retrieve source information from the source telephony system 106 based on a source indicator. The source information can specify a state of the source endpoint 104 in the source telephony system 106. Moreover, the interface component 116 can retrieve destination information from the destination telephony system 110 based on a destination indicator. The destination information can specify a state of the destination endpoint 108 in the destination telephony system 110.

The source indicator and the destination indicator can be the same indicator or differing indicators. According to an illustration where the source indicator and the destination indicator are the same, the source indicator and the destination indicator can specify the same username (e.g., user123) that identifies both a source user profile configured for the source endpoint 104 in the source telephony system 106 and a destination user profile configured for the destination endpoint 108 in the destination telephony system 110. Alternatively, the source indicator and the destination indicator can be differing indicators. When the indicators differ, the source indicator can be translated to the destination indicator or the destination indicator can be translated to the source indicator. For instance, the source indicator can identify extension 1000 on the source telephony system 106, which can be translated to extension 2165551000 on the destination telephony system 110. Translations between indicators can be performed programmatically, utilizing a lookup, or the like. According to another example, when the indicators differ, it is contemplated that both the source indicator and the destination indicator can be received by the computing system 102 (e.g., a translation between indictors need not be performed).

Various indicator types are intended to fall within the scope of the hereto appended claims. For example, the source indicator can identify the source endpoint 104 (e.g., the source indicator can specify a device name, a location, and/or a description of the source endpoint 104). According to another example, the destination indicator can identify the destination endpoint 108 (e.g., the destination indicator can specify a device name, a location, and/or a description of the destination endpoint 108). Pursuant to a further example, the source indicator can identify a source extension assigned to the source endpoint 104 (e.g., an extension number assigned to the source endpoint 104 in the source telephony system 106). In accordance with yet another example, the destination indicator can identify a destination extension assigned to the destination endpoint 108 (e.g., an extension number assigned to the destination endpoint 108 in the destination telephony system 110). According to another example, the source indicator can identify a source user profile configured for the source endpoint 104 in the source telephony system 106. Pursuant to yet a further example, the destination indicator can identify a destination user profile configured for the destination endpoint 108 in the destination telephony system 110. Further, a combination of the foregoing indicator types can be utilized. However, it is also contemplated that other indicator types are intended to fall within the scope of the hereto appended claims.

Figure 2:
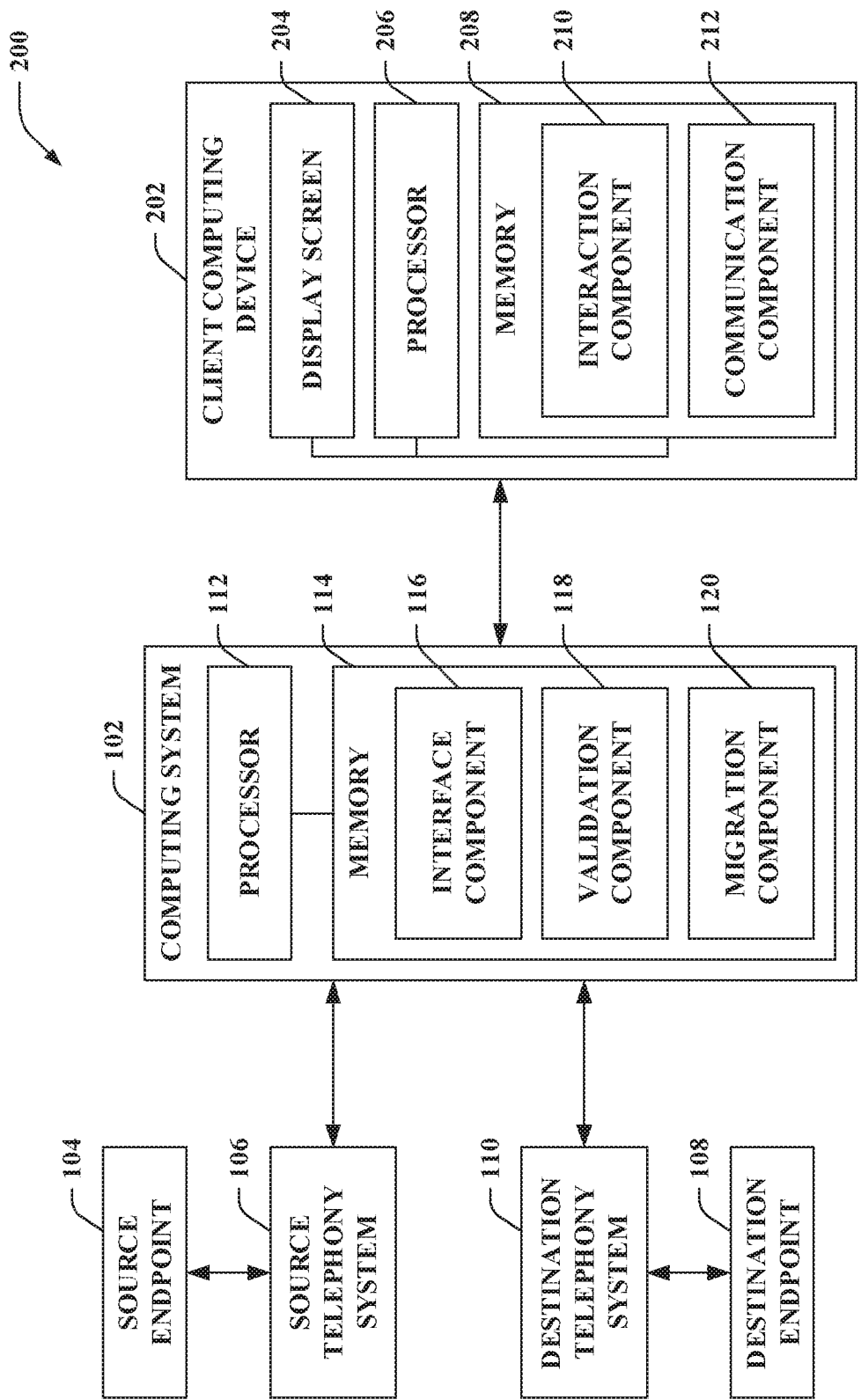
FIG. 2 illustrates a functional block diagram of another exemplary system that supports individualized migration between telephony systems.
Figure 3:
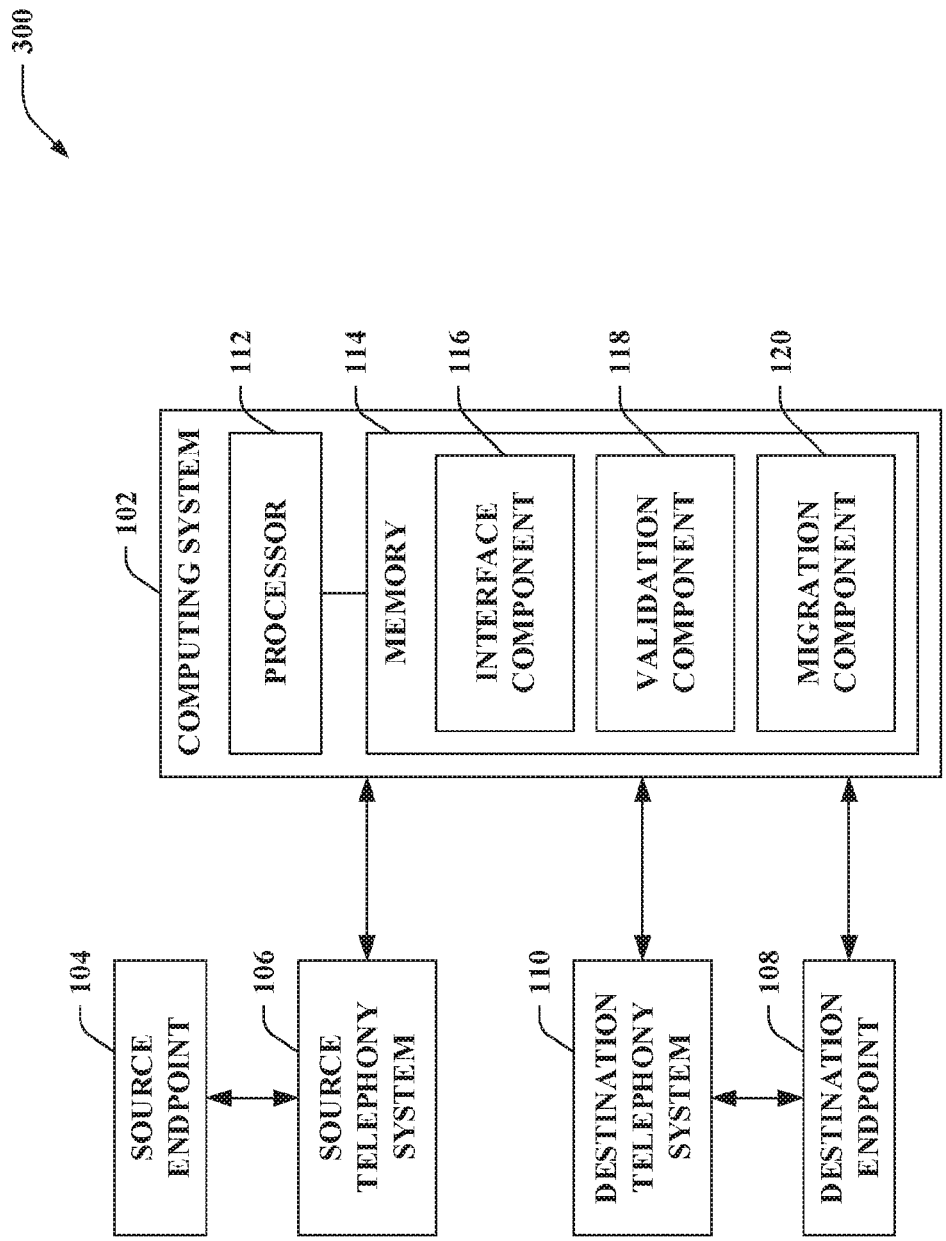
FIG. 3 illustrates a functional block diagram of an exemplary system that supports self-service migration of a destination endpoint.

An indicator (e.g., the source indicator and/or the destination indicator) can be obtained by the computing system 102 in substantially any manner. For example, the indicator can be received by the computing system 102 from a client computing device (as shown in FIG. 2). According to another example, the indicator can be received by the computing system 102 from an endpoint (e.g., the source endpoint 104 or the destination endpoint 108); for instance, the computing system 102 can receive the indicator from the destination endpoint 108 as part of self-activation of the destination endpoint 108 (as depicted in FIG. 3). Pursuant to yet another example, the indicator can be received by the computing system 102 based on user input obtained by the computing system 102. Moreover, as described above, if the source indicator and the destination indicator differ, it is contemplated that both the source indicator and the destination indicator can be received by the computing system 102 in substantially any manner or one of the indicators can be received by the computing system 102 in substantially any manner and the other indicator can be determined based on the received indicator (e.g., the source indicator can be identified based on the destination indicator, the destination indicator can be identified based on the source indicator).

The memory 114 further includes a validation component 118 configured to validate whether the source endpoint 104 in the source telephony system 106 is migratable to the destination endpoint 108 in the destination telephony system 110 based on the source information and the destination information. The validation component 118 can perform validation checks that are dependent on the type of the source telephony system 106 and/or the type of the destination telephony system 110. Further, until the source endpoint 104 in the source telephony system 106 is validated by the validation component 118 to be migratable to the destination endpoint 108 in the destination telephony system 110, an ability to perform a migration of the source endpoint 104 to the destination endpoint 108 can be disabled.

According to various examples, the validation component 118 can detect whether the source endpoint 104 exists, whether the source endpoint 104 is currently able to be migrated, whether a destination extension is eligible for activation, whether a type or model of the destination endpoint 108 matches a type or model specified in the destination information retrieved from the destination telephony system 110 (e.g., when provisioning a profile onto the destination endpoint 108), and so forth. However, it is contemplated that the conditions checked by the validation component 118 can be a function of the type of the source telephony system 106 and the type of the destination telephony system 110.

The memory 114 also includes a migration component 120 configured to perform the migration of the source endpoint 104 in the source telephony system 106 to the destination endpoint 108 in the destination telephony system 110 subsequent to validating that the source endpoint 104 in the source telephony system 106 is migratable to the destination endpoint 108 in the destination telephony system 110. Accordingly, the source endpoint 104 in the source telephony system 106 is activated prior to the migration and deactivated subsequent to the migration. Moreover, the destination endpoint 108 in the destination telephony system 110 is provisioned and non-active prior to the migration and activated subsequent to the migration.

As part of the migration of the source endpoint 104 to the destination endpoint 108, the migration component 120 can deactivate the source endpoint 104 in the source telephony system 106. Moreover, the migration component 120 can activate the destination endpoint 108 in the destination telephony system 110. The migration component 120 can further create a route in the source telephony system 106 to the destination endpoint 108 in the destination telephony system 110 as part of the migration, for example. According to another example, the migration component 120 can also remove a route in the destination telephony system 110 as part of the migration; however, the claimed subject matter is not so limited. Yet, it is to be appreciated that the elements of the migration performed by the migration component 120 can be a function of the type of the source telephony system 106 and the type of the destination telephony system 110. Moreover, it is contemplated that the elements of the migration can be dynamically altered based on the state of the source endpoint 104 and/or the state of the destination endpoint 108 (e.g., to cause a condition for enabling the migration to be satisfied). For instance, if the source endpoint 104 has a message waiting light that is illuminated, the source telephony system 106 may not allow the source endpoint 104 to be migrated; thus, the migration for the source endpoint 104 can be dynamically altered to cause the message waiting light to be turned off, thereby enabling the source endpoint 104 to be migrated.

Information is imported to the destination telephony system 110 in advance of the performance of operations by the computing system 102. Thus, the destination telephony system 110 is provisioned prior to the validation and the migration described herein. The computing system 102 enables the endpoints to be cut-over on an individualized basis.

The computing system 102 can further manage concurrency of access to the source telephony system 106. Additionally or alternatively, the computing system 102 can manage the concurrency of access to the destination telephony system 110. According to an illustration, the computing system 102 can communicate with a first client computing device for migrating a first source endpoint to a first destination endpoint and can communicate with a second client computing device for migrating a second source endpoint to a second destination endpoint (as well as substantially any number of additional client computing devices). The computing system 102 can manage the concurrency of access to the source telephony system 106 and/or the destination telephony system 110. For instance, the source telephony system 106 and/or the destination telephony system 110 can support a limited number of concurrent sessions at any given time; accordingly, the computing system 102 can manage the concurrency of the commands sent to the source telephony system 106 and/or the destination telephony system 110. It is further contemplated that, if the computing system 102 is a computing device in a peer-to-peer network, the concurrency can be managed in a peer-to-peer manner.

The computing system 102 can be employed during a roll-out phase of a telephony migration from the source telephony system 106 to the destination telephony system 110. Conventional migration oftentimes involves destination endpoints being physically installed in a group during a window of time (e.g., a week, night, weekend, day) and then having the bulk of the endpoints migrated from the source telephony system 106 to the destination telephony system 110 in a batch. However, these conventional migration approaches are limited by timeline constraints. Moreover, errors are oftentimes introduced as part of conventional migration approaches (with significant failure domains depending on the number of endpoints in a batch). Further, traditional migration approaches often have constrained testing capabilities; for instance, after a cut-over, typical testing procedures can allow for testing phone numbers, while it may be difficult at best to coordinate testing of specific destination endpoints. Conventional migration approaches commonly also involve significant end user disruption (e.g., due to needing to visit the end user once to place a destination endpoint and another time to remove a source endpoint) and oftentimes are performed after-hours or over weekends. Moreover, for IP to IP migrations, it may be difficult to install both source and destination endpoints simultaneously; thus, conventional migration approaches may involve short cut-over windows.

In contrast, the computing system 102 can enable a single endpoint to be migrated in an event. Thus, a particular endpoint can be migrated as part of a particular event when that endpoint is available to be migrated. Moreover, the destination endpoint 108 can be tested at the time of cut-over (e.g., upon performance of the migration).

Referring now to FIG. 2, illustrated is another system 200 that supports individualized migration between telephony systems. The system 200 again includes the computing system 102, which controls the migration of the source endpoint 104 in the source telephony system 106 to the destination endpoint 108 in the destination telephony system 110. In the example set forth in FIG. 2, the computing system 102 can be or include one or more server computing devices.

The system 200 further includes a client computing device 202. According to various examples, the client computing device 202 can be a mobile computing device (e.g., a laptop computing device, a tablet computing device, a mobile telephone, a smartphone, a handheld computing device, a wearable computing device, a personal digital assistant); thus, the mobile computing device can be carried to a physical location of the source endpoint 104 and the destination endpoint 108 (or device(s) that can execute such endpoints for software-based endpoints) when the migration is to be performed. Yet, it is to be appreciated that the claimed subject matter is not so limited (e.g., the client computing device 202 can alternatively be a desktop computing device).

The client computing device 202 can include a display screen 204, at least one processor 206, and memory 208. The processor 206 is configured to execute instructions loaded into the memory 208. Moreover, although the display screen 204 is illustrated as being included in the client computing device 202, it is to be appreciated that the display screen 204 can be separate from the client computing device 202 (e.g., the display screen 204 can be electronically coupled with the client computing device 202).

The memory 208 of the client computing device 202 can include an interaction component 210 configured to receive user input and/or render a user interface via the display screen 204. The interaction component 210 can accept user inputs via a touchscreen (e.g., the display screen 204), a keyboard, a button of the client computing device 202, a sensor of the client computing device 202 (e.g., camera, accelerometer, gyroscope), an external input device coupled with the client computing device 202, a natural user interface, a combination thereof, or the like. Moreover, the memory 208 of the client computing device 202 can include a communication component 212 configured to transmit information to and/or receive information from the computing system 102.

The interaction component 210 can receive a first user input at the client computing device 202. For example, the first user input can cause text to be entered into a field of a graphical user interface rendered by the interaction component 210 on the display screen 204. Pursuant to another example, the first user input can cause information pertaining to the source endpoint 104 and/or the destination endpoint 108 to be captured. According to various illustrations, a geographic location of the client computing device 202 can be detected (e.g., while the client computing device 202 is positioned within proximity of the source endpoint 104 and/or the destination endpoint 108), a barcode or Quick Response (QR) code associated with the source endpoint 104 and/or the destination endpoint 108 can be scanned, an identity of the source endpoint 104 and/or the destination endpoint 108 can be detected via near field communication (NFC), etc. responsive to the first user input.

The interaction component 210 can obtain an indicator pertaining to the source endpoint 104 and/or the destination endpoint 108 based on the first user input (e.g., the source indicator and/or the destination indicator). By way of illustration, pursuant to the example where the first user input causes text to be entered into a field of a rendered graphical user interface, the text can specify a source extension assigned to the source endpoint 104. Following this illustration, the source extension can be the indicator. Yet, it is to be appreciated that the claimed subject matter is not limited to the foregoing illustration.

It is also contemplated that the interaction component 210 can obtain both the source indicator and the destination indicator based on the first user input (if the indicators differ). The indicators can be received at different times (e.g., a first portion of the first user input can be received during a first time period and a second portion of the first user input can be received during a second time period), for instance; however, the claimed subject matter is not so limited.

Moreover, the communication component 212 can transmit the indicator (e.g., one or both of the source indicator and the destination indicator) to the computing system 102. Accordingly, the indicator can be transmitted by the communication component 212 to the computing system 102 responsive to receipt of the first user input at the client computing device 202.

The computing system 102 can receive the indicator from the client computing device 202. The interface component 116 of the computing system 102 can retrieve the source information from the source telephony system 106 and the destination information for the destination telephony system 110 based on the indicator (and/or a differing indicator identified based on the indicator). Moreover, the validation component 118 can perform the validation concerning whether the source endpoint 104 is migratable to the destination endpoint 108. Validation information that specifies whether the source endpoint 104 in the source telephony system 106 is validated to be migratable to the destination endpoint 108 in the destination telephony system 110 can be transmitted from the computing system 102. Thus, the computing system 102 can transmit at least a portion of the source information and at least a portion of the destination information to the client computing device 202 for display by the client computing device 202.

The communication component 212 can receive the validation information from the computing system 102. The interaction component 210 can further cause the validation information to be displayed on the display screen 204. When and only when the validation information specifies that the source endpoint 104 is validated to be migratable to the destination endpoint 108, the interaction component 210 can enable a second user input to be received at the client computing device 202 to cause migration of the source endpoint 104 to the destination endpoint 108 to be performed. Responsive to receipt of the second user input at the client computing device 202, the communication component 212 can transmit a command to the computing system 102. The command can cause the computing system 102 to perform the migration of the source endpoint 104 in the source telephony system 106 to the destination endpoint 108 in the destination telephony system 110 as described herein.

Thus, subsequent to validating that the source endpoint 104 in the source telephony system 106 is migratable to the destination endpoint 108 in the destination telephony system 110, the computing system 102 can receive the command from the client computing device 202 to perform the migration. Responsive to receipt of the command from the client computing device 202, the migration component 120 can initiate the performance of the migration of the source endpoint 104 in the source telephony system 106 to the destination endpoint 108 in the destination telephony system 110.

With reference to FIG. 3, illustrated is a system 300 that supports self-service migration of the destination endpoint 108. The system 300 again includes the computing system 102, the source telephony system 106, the destination telephony system 110, the source endpoint 104, and the destination endpoint 108. In the example set forth in FIG. 3, the destination endpoint 108 can perform self-activation. Thus, the destination endpoint 108 can transmit an indicator (e.g., the destination indicator and/or the source indicator) to the computing system 102 as part of the self-activation of the destination endpoint 108 in the destination telephony system 110.

According to an example, the destination endpoint 108 can cause an activation icon to be displayed (e.g., on a display screen of the destination endpoint 108, on a display screen of a computing device that executes the destination endpoint 108 if the destination endpoint 108 is a software-based endpoint). The activation icon can be displayed when the destination endpoint 108 is provisioned and non-active. User input that selects the activation icon can be received by the destination endpoint 108, which can cause the indicator to be provided from the destination endpoint 108 to the computing system 102. Thus, the selection of the activation icon can initiate performance of the validation (e.g., by the validation component 118) and the migration (e.g., by the migration component 120) as described herein.

Figure 4:
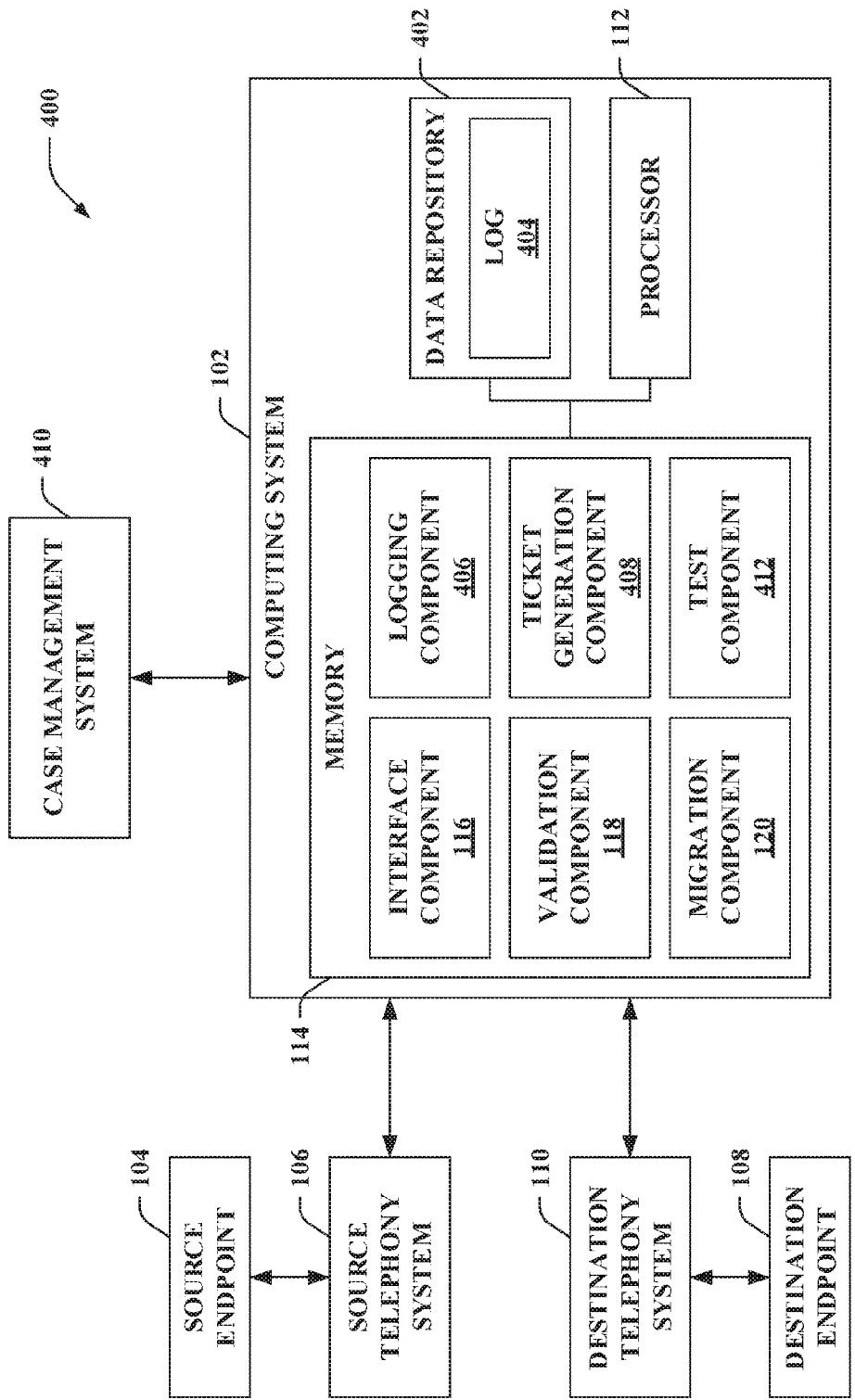
FIG. 4 illustrates a functional block diagram of yet another exemplary system that supports individualized migration between telephony systems.

Turning now to FIG. 4, illustrated is another system 400 that supports individualized migration between telephony systems. Again, the system 400 includes the computing system 102, which controls migration of the source endpoint 104 in the source telephony system 106 to the destination endpoint 108 in the destination telephony system 110. According to various embodiments, the computing system 102 can further include at least one data repository 402. The data repository 402 can include a log 404.

The memory 114 of the computing system 102 can include a logging component 406 that can store, in the log 404, the source information retrieved from the source telephony system 106 by the interface component 116. Moreover, the logging component 406 can store, in the log 404, the destination information retrieved from the destination telephony system 110 by the interface component 116. Further, the logging component 406 can store information describing executed transactions in the log 404. The executed transactions can be transactions that are executed as part of the validation performed by the validation component 118. Additionally or alternatively, the executed transactions can be transactions that are executed as part of the migration performed by the migration component 120.

Steps of a validation or migration specified in the log 404 can be re-run. Accordingly, one or more of the executed transactions described by the information stored in the log 404 can be re-executed. Further, the executed transactions can be re-executed responsive to a selection from the log 404. For example, the log 404 can be viewable and failed steps of a migration can be identified (e.g., the executed transactions that are re-executed can be part of the migration). Following this example, user input can be received to cause the failed steps of the migration to be retried to attempt to recover from the failure. Additionally or alternatively, manual intervention can be supported to attempt to recover from a failed step of the migration, while allowing further steps of the migration specified in the log 404 to be re-run.

The memory 114 can further include a ticket generation component 408 configured to create a ticket in a case management system 410. The ticket generation component 408 can further link the ticket to the log 404. According to an example, a user interface rendered by the interaction component 210 of the client computing device 202 of FIG. 2 can include a field for opening a ticket in the case management system 410. Responsive to receipt of user input (e.g., inputting text in the field, selecting an icon to create the ticket), the communication component 212 can send data to the computing system 102; in response to receiving such data, the ticket generation component 408 can create the ticket in the case management system 410 and can link the ticket to the log 404 (e.g., the ticket can be linked to pertinent information in the log 404).

It is to be appreciated that a ticket can be generated by the ticket generation component 408 when validation fails, and thus, an ability to perform migration remains disabled. Further, a ticket can be generated by the ticket generation component 408 when migration fails. Accordingly, the ticket may automatically be generated by the ticket generation component 408 when the validation or migration fails. Alternatively, the ticket may be generated responsive to user input received subsequent to outputting a notification specifying that the validation or migration failed. Since the ticket is linked to the log 404, transactions can be retrieved from the log 404 as opposed to having to re-execute commands that lead to the failed validation or migration.

Further, a ticket can be generated by the ticket generation component 408 when an ability to perform the migration is enabled or when the migration is performed. For instance, if the destination telephony system 110 includes an improper value (e.g., a user name spelled incorrectly, a display value is improper) that does not impact operation, the migration may be performed, while a ticket can be generated in the case management system 410 by the ticket generation component 408. Again, it is to be appreciated that the ticket can be linked to the log 404.

The validation component 118 can validate whether the source endpoint 104 in the source telephony system 106 is migratable to the destination endpoint 108 in the destination telephony system 110 by evaluating whether conditions for the migration are satisfied based on the source information and the destination information. The computing system 102 can enable an ability to perform the migration when the conditions are identified as being satisfied. Alternatively, when a particular condition is identified as being unsatisfied, various operations can be implemented by the computing system 102. Examples of the operations that can be implemented responsive to a particular condition being identified as being unsatisfied are described below. It is contemplated that the operations implemented can be a function of an identity of the particular condition that is unsatisfied.

According to an example, when a particular condition is identified as being unsatisfied, the computing system 102 can continue to disable the ability to perform the migration. Thus, if a condition fails to be met, performance of the migration can be inhibited. Moreover, when the particular condition is identified as being unsatisfied during the validation, the ticket generation component 408 can create a ticket in the case management system 410 and link the ticket to the log 404.

According to another example, when a particular condition is identified as being unsatisfied, the computing system 102 can enable the ability to perform the migration even though the particular condition is identified as being unsatisfied. Further following this example, the ticket generation component 408 can create a ticket in the case management system 410 and link the ticket to the log 404 when the particular condition is identified as being unsatisfied during the validation.

Pursuant to another example, when a particular condition is identified as being unsatisfied, the computing system 102 can dynamically alter the migration to be performed such that the particular condition is satisfied as part of the migration to be performed by the migration component 120. Moreover, the computing system 102 can enable an ability to perform the migration as altered. It is to be appreciated that the ticket generation component 408 can create a ticket in the case management system 410; however, the claimed subject matter is not so limited.

Moreover, the memory 114 can include a test component 412. Subsequent to performing the migration via the migration component 120, the test component 412 can cause a one-sided, two-way phone call test to be performed for the destination endpoint 108. The test component 412 can further track results of the one-sided, two-way phone call test for the destination endpoint 108. According to an example, subsequent to the migration of the source endpoint 104 to the destination endpoint 108, performance of the one-sided, two-way phone call test for the destination endpoint 108 can be caused responsive to receipt of a third user input at the client computing device 202 of FIG. 2. The test component 412, for instance, can perform the one-sided, two-way phone call test for the destination endpoint 108 utilizing a third-party service; however, the claimed subject matter is not so limited.

Figure 5:
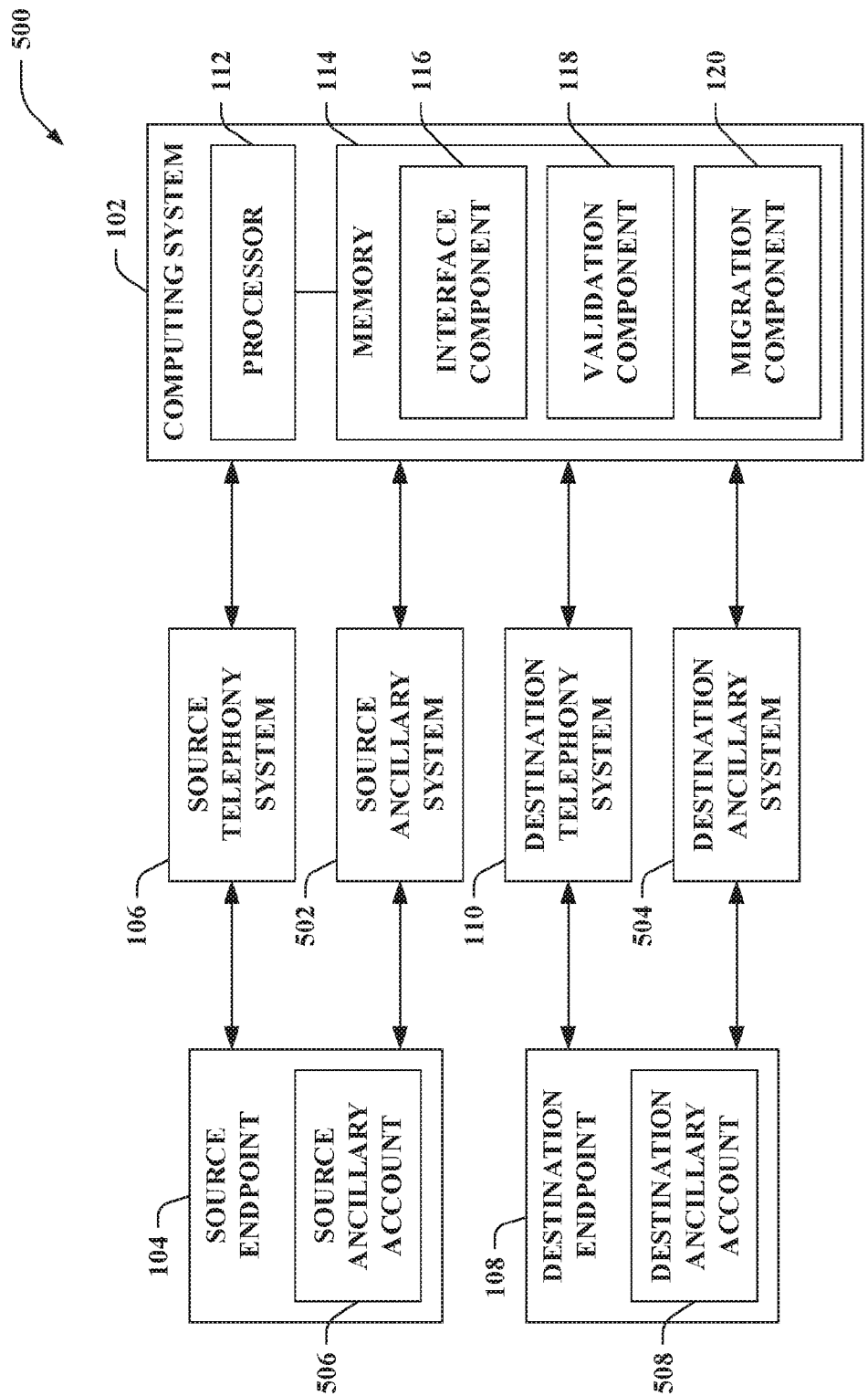
FIG. 5 illustrates a functional block diagram of still another exemplary system that performs individualized migration between telephony systems.

Now turning to FIG. 5, illustrated is another system 500 that performs individualized migration between telephony systems. In the example set forth in FIG. 5, the source telephony system 106 can be separate from a source ancillary system 502. Additionally, the destination telephony system 110 can be separate from a destination ancillary system 504 in the example shown in FIG. 5. The source ancillary system 502 and the destination ancillary system 504 can be voicemail systems, instant messaging systems, conferencing systems, contact centers, or the like. Moreover, the system 500 can include a plurality of different types of source ancillary systems and/or a plurality of different types of destination ancillary systems.

It is contemplated that in other examples set forth herein, where the source telephony system 106 and the destination telephony system 110 are described without the source ancillary system 502 or the destination ancillary system 504, the source telephony system 106 can include a source ancillary system (e.g., the source ancillary system 502) and the destination telephony system 110 can include a destination ancillary system (e.g., the destination ancillary system 504). Moreover, it is to be appreciated that these other examples can be extended to scenarios where the source telephony system 106 is separate from the source ancillary system 502 and/or the destination telephony system 110 is separate from the destination ancillary system 504.

A source ancillary account 506 (for the source ancillary system 502) can be assigned to the source endpoint 104, and a destination ancillary account 508 (for the destination ancillary system 504) can be assigned to the destination endpoint 108. The ancillary accounts 506-508 can be voicemail accounts, instant messaging accounts, conferencing accounts, other communication-related service accounts, or a combination thereof. The destination ancillary account 508 assigned to the destination endpoint 108 can be configured as part of the migration performed by the migration component 120. When performing the migration of the source endpoint 104 to the destination endpoint 108, the migration component 120 can deactivate the source ancillary account 506 assigned to the source endpoint 104 in the source ancillary system 502. Additionally or alternatively, the source ancillary account 506 can be deleted as part of the migration performed by the migration component 120. Moreover, as part of performing the migration, the migration component 120 can activate the destination ancillary account 508 assigned to the destination endpoint 108 in the destination ancillary system 504.

Pursuant to another example, it is contemplated that the same ancillary account can be used as both source and destination (e.g., the source ancillary account 506 can be the same as the destination ancillary account 508). Following this example, as part of the migration, the migration component 120 can perform operations to change the configuration of the ancillary account to make the ancillary account compatible with the destination telephony system 110 (e.g., a destination private branch exchange (PBX)). Thus, the ancillary account can be modified by the migration component 120 to be compatible with the destination telephony system 110 (and no longer operate with the source telephony system 106).

According to yet another example, it is to be appreciated that the computing system 102 can support a migration from the source ancillary system 502 to the destination ancillary system 504 without migrating from the source telephony system 106 to the destination telephony system 110. Following this example, the validation component 118 can similarly validate whether the migration can occur, and the migration component 120 can perform the migration subsequent to the validation. For instance, the migration can include deactivating or deleting a source ancillary account assigned to an endpoint and activating a destination ancillary account assigned to the endpoint. According to another illustration, the migration can include performing operations to change a configuration of an ancillary account assigned to an endpoint.

Figure 6:
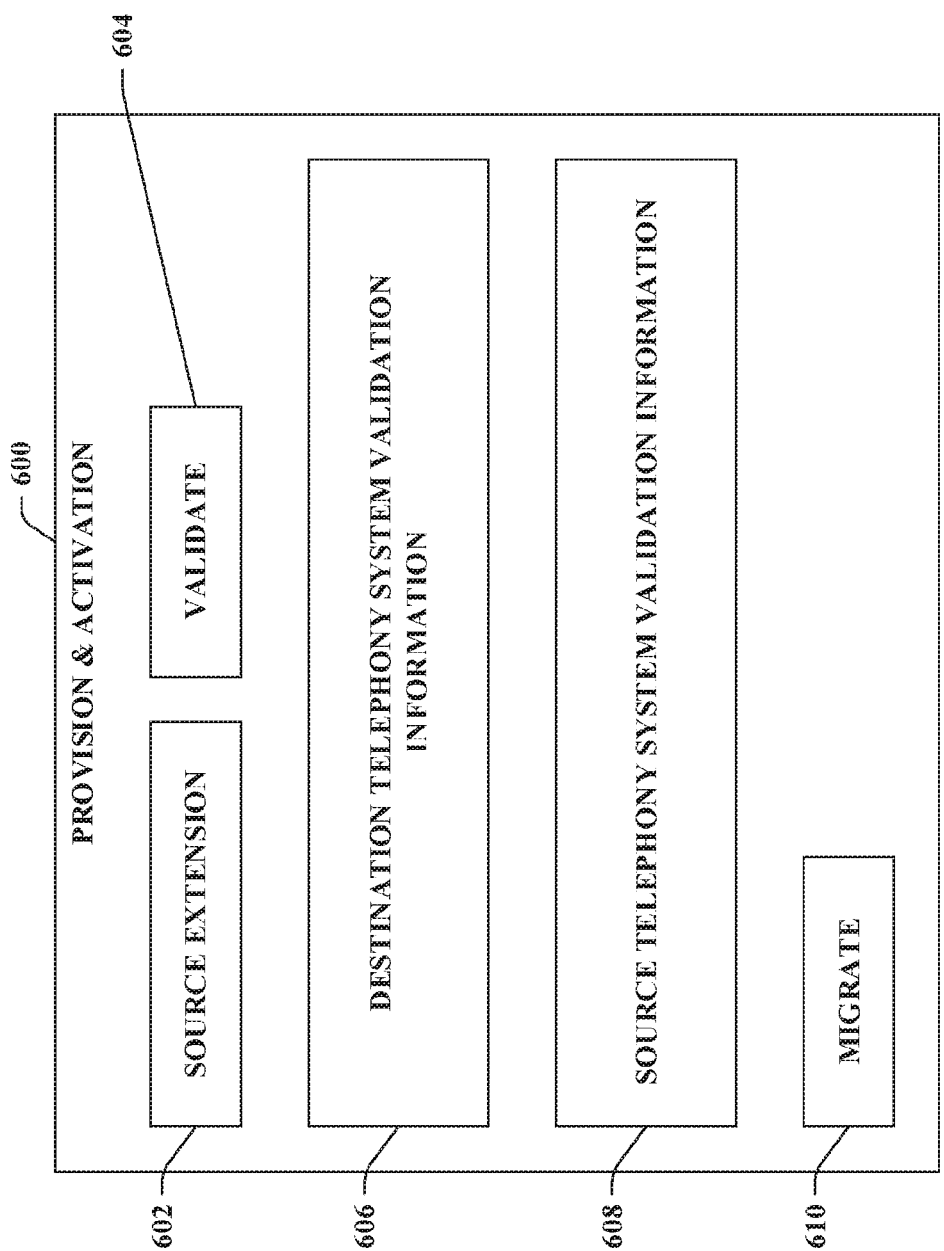
FIGS. 6-7 illustrate an exemplary graphical user interface that can be rendered on a display screen in accordance with various embodiments.
Figure 7:
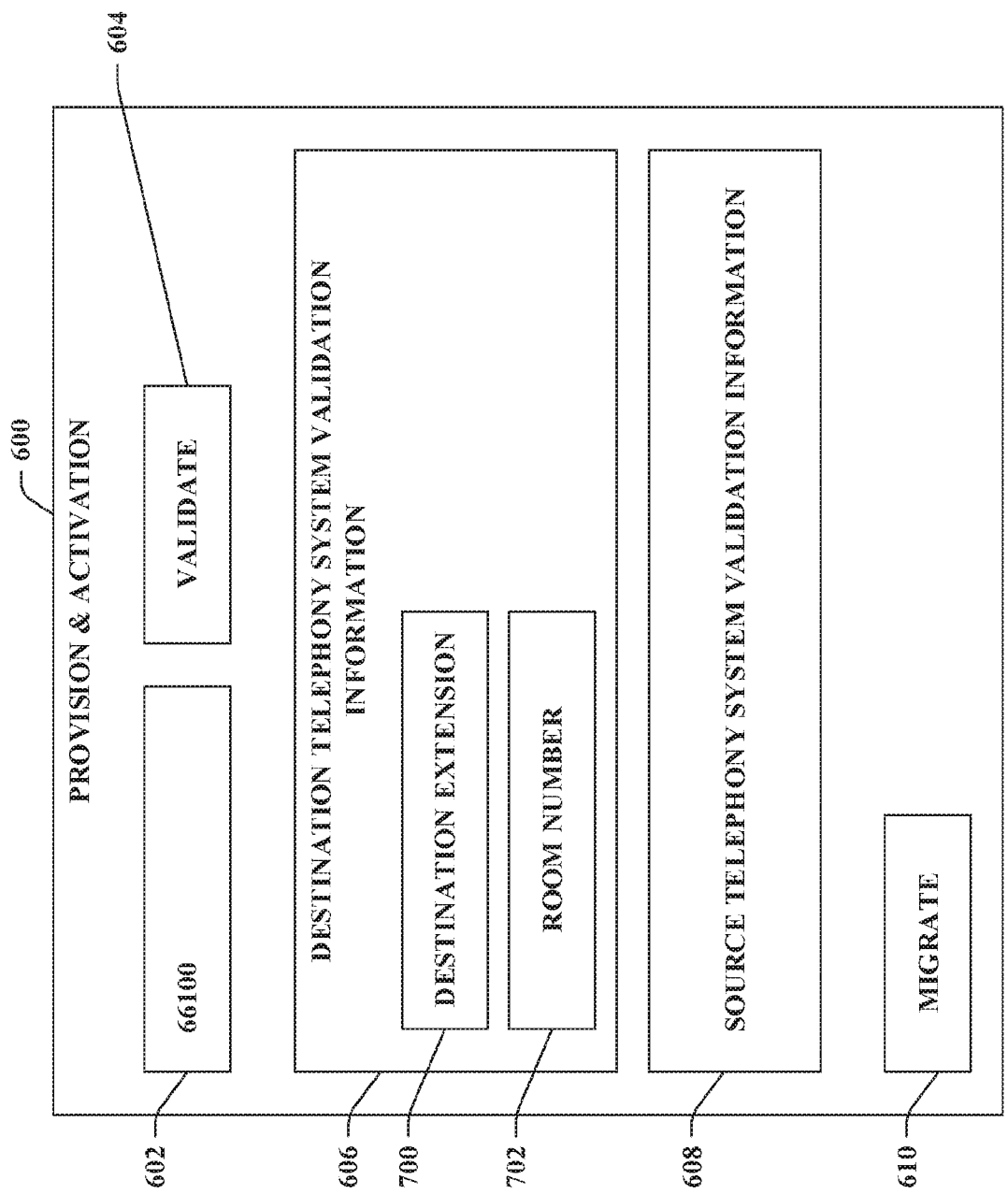

Referring now to FIGS. 6-7, illustrated is an exemplary graphical user interface 600 that can be rendered on a display screen. For instance, the graphical user interface 600 can be displayed on the display screen 204 of the client computing device 202, a display screen of the destination endpoint 108, a display screen electronically coupled with the computing system 102, or the like. It is to be appreciated that the exemplary graphical user interface 600 is provided for illustration purposes, and the claimed subject matter is not limited to this example.

As shown in FIG. 6, the graphical user interface 600 includes a source extension field 602. While the source extension field 602 is shown, it is contemplated that other types of fields can additionally or alternatively be included in the graphical user interface 600 (e.g., a username field, a destination extension field). Text can be inputted into the source extension field 602, where the text can indicate a source extension assigned to a source endpoint (e.g., the source endpoint 104) in a source telephony system (e.g., the source telephony system 106). The source endpoint is activated in the source telephony system, and it is desirable to migrate the source endpoint. Moreover, the user interface 600 includes a validate button 604. Responsive to user input that selects the validate button 604, validation of whether the source endpoint (identified based on the source extension entered into the source extension field 602) is migratable to a destination endpoint (e.g., the destination endpoint 108) can be performed. The graphical user interface 600 further includes a destination telephony system validation information field 606, a source telephony system validation information field 608, and a migrate button 610, which are described in greater detail in connection with FIG. 7.

FIG. 7 depicts the source extension "66100" having been entered into the source extension field 602 and the validate button 604 having been selected. The source telephony system validation information field 608 can include validation information pertaining to whether the validation for the source endpoint is successful. Moreover, as depicted in FIG. 7, additional fields prompting a user for additional inputs can be included in the graphical user interface 600. In particular, a destination extension field 700 and a room number field 702 can be included within the destination telephony system validation information field 606. A current extension number for the destination endpoint (e.g., automatically assigned to the destination endpoint prior to migration) can be entered into the destination extension field 700. The current extension number can be utilized to identify the destination endpoint to which it is desired to migrate the source endpoint. Moreover, a room number to be associated with the destination endpoint can be entered into the room number field 702; the entered room number can be incorporated into the destination telephony system as part of a migration workflow in the depicted example. Yet, it is contemplated that other types of information can be requested via the graphical user interface 600 and used as part of the migration workflow.

Substantially any user-defined information about the destination endpoint can be collected via the graphical user interface 600, such as the room number being obtained via the room number field 702. The information collected about the destination endpoint can be logged and/or used to update records within the destination telephony system 110 to provide additional detail. Thus, in the depicted example, the room number can be collected via the graphical user interface 600, where this information may be unknown ahead of time and may be desirable to collect at the time of migration. Again, while the room number is described in the example shown in FIG. 7, it is contemplated that substantially any other type of information pertaining to the destination endpoint can additionally or alternatively be collected via the graphical user interface 600.

Once the destination telephony system validation information field 606 and the source telephony system validation information field 608 (as well as any voicemail validation information field(s), if included in the graphical user interface 600) show that validation is successful, the migrate button 610 can be activated. Further, responsive to user input that selects the migrate button 610, the migration from the source endpoint to the destination endpoint can be performed.

Figure 8:
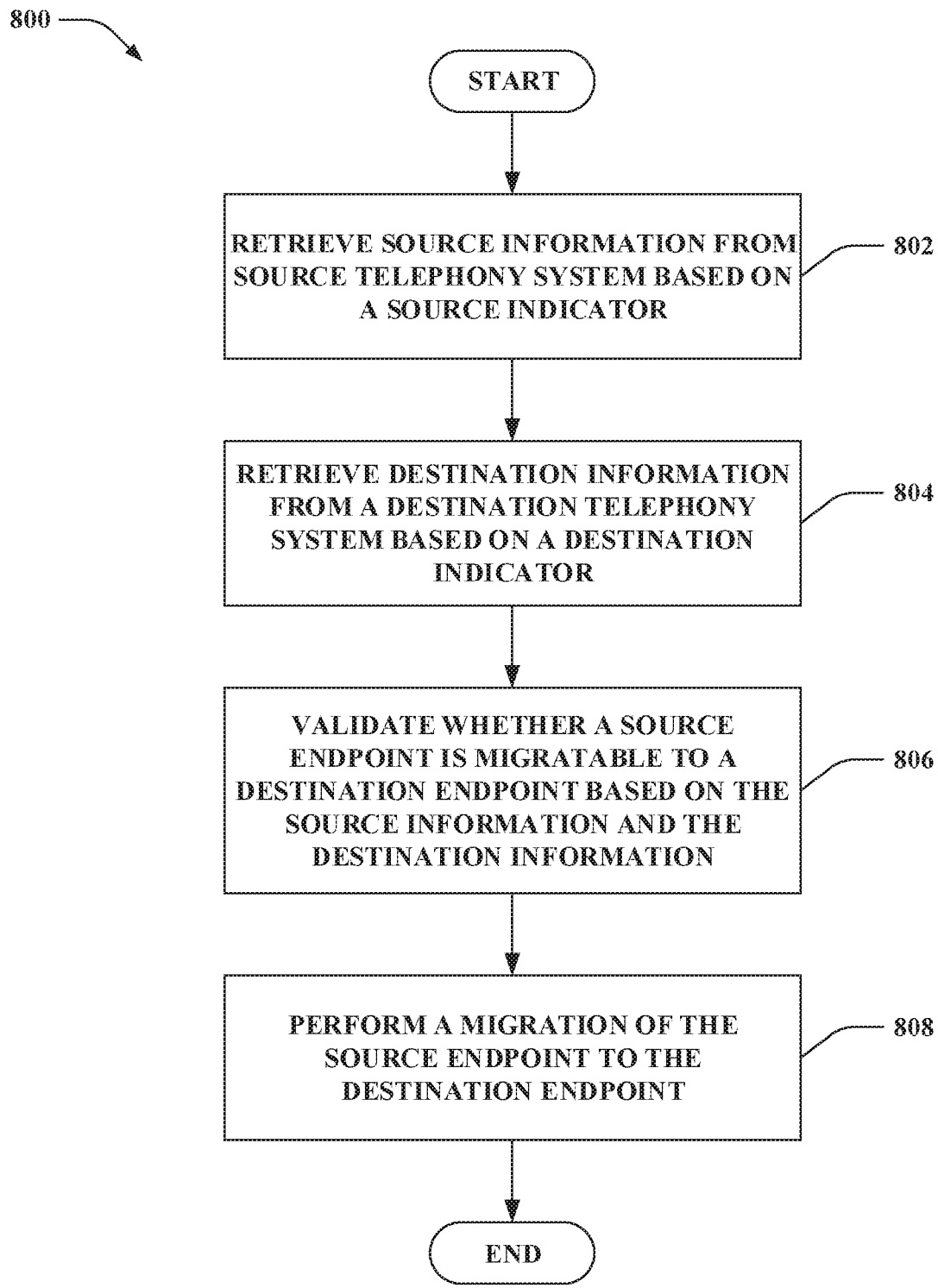
FIG. 8 is a flow diagram that illustrates an exemplary methodology of controlling a migration of a source endpoint in a source telephony system to a destination endpoint in a destination telephony system.
Figure 9:
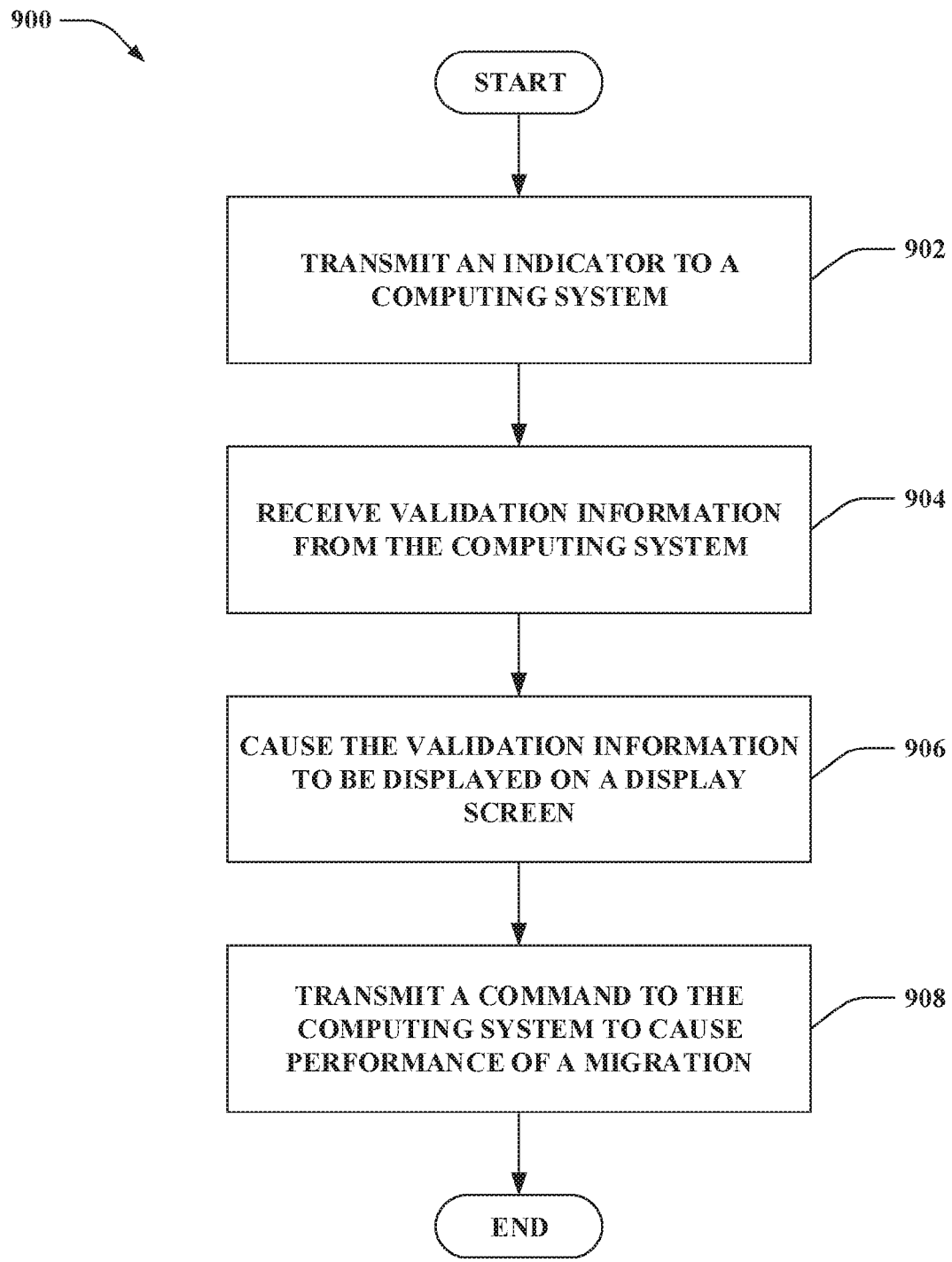
FIG. 9 is a flow diagram that illustrates an exemplary methodology of operating a client computing device to cause a migration of a source endpoint in a source telephony system to a destination endpoint in a destination telephony system.

FIGS. 8-9 illustrate exemplary methodologies relating to individualized migration of endpoints between telephony systems. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of controlling a migration of a source endpoint in a source telephony system to a destination endpoint in a destination telephony system. At 802, source information can be retrieved from the source telephony system based on a source indicator. The source information can specify a state of the source endpoint in the source telephony system. At 804, destination information can be retrieved from the destination telephony system based on a destination indicator. The destination information can specify a state of the destination endpoint in the destination telephony system. It is contemplated that the source indicator and the destination indicator can be the same indicator or differing indicators. At 806, a validation can be performed concerning whether the source endpoint in the source telephony system is migratable to the destination endpoint in the destination telephony system based on the source information and the destination information. At 808, subsequent to validating that the source endpoint in the source telephony system is migratable to the destination endpoint in the destination telephony system, a migration of the source endpoint in the source telephony system to the destination endpoint in the destination telephony system can be performed. The source endpoint in the source telephony system can be activated prior to the migration and deactivated subsequent the migration. Further, the destination endpoint in the destination telephony system can be provisioned and non-active prior to migration and activated subsequent to the migration.

Now referring to FIG. 9, illustrated is a methodology 900 of operating a client computing device to cause a migration of a source endpoint in a source telephony system to a destination endpoint in a destination telephony system. At 902, responsive to receipt of a first user input at the client computing device, an indicator can be transmitted to a computing system. The indicator can be based on the first user input. Moreover, the indicator can pertain to at least one of the source endpoint or the destination endpoint (e.g., the indicator can be or include the source indicator and/or the destination indicator). At 904, validation information can be received from the computing system (e.g., subsequent to transmission of the indicator). The validation information can specify whether the source endpoint in the source telephony system is validated to be migratable to the destination endpoint in the destination telephony system. At 906, the validation information can be caused to be displayed on a display screen. At 908, when and only when the validation information specifies that the source endpoint is validated to be migratable to the destination endpoint, a command can be transmitted to the computing system responsive to receipt of a second user input at the client computing device. The command can cause the computing system to perform the migration of the source endpoint in the source telephony system to the destination endpoint in the destination telephony system.

Figure 10:
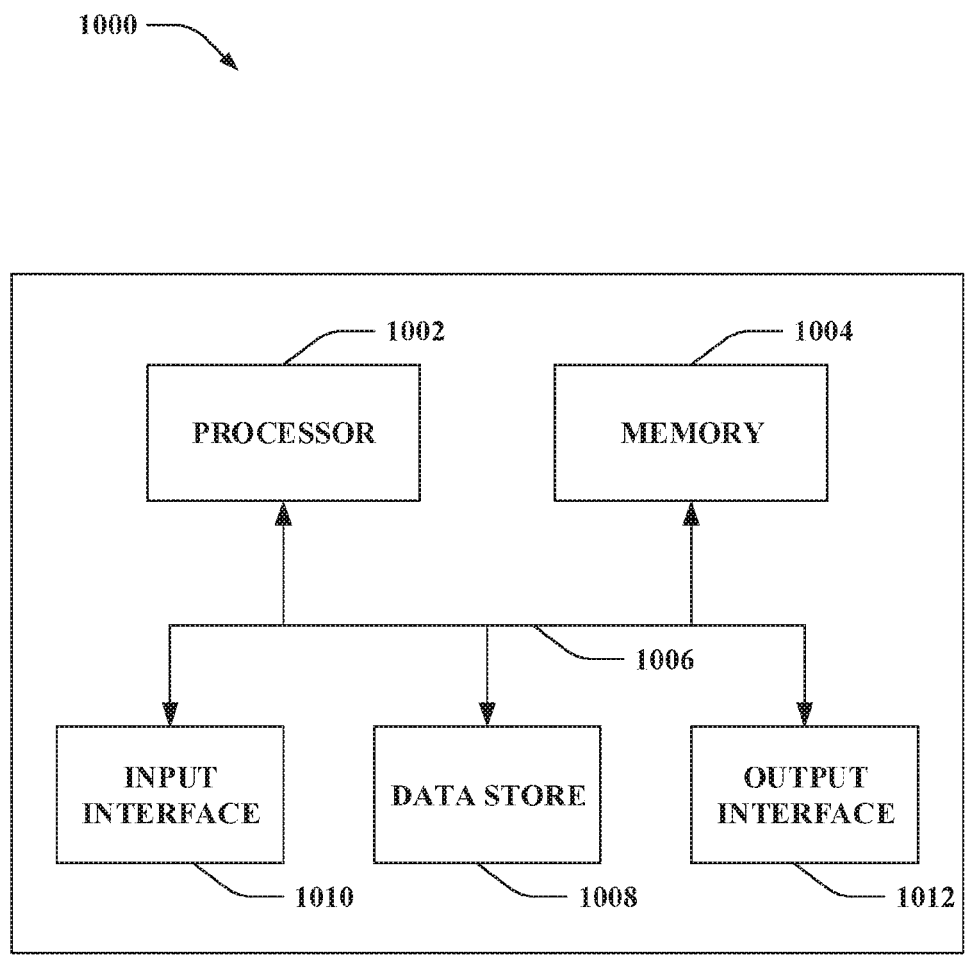
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing system 102 may be or include the computing device 1000. According to another example, the client computing device 202 may be or include the computing device 1000. Pursuant to other examples, the computing device 1000 can execute the source endpoint 104 or the destination endpoint 108. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store logs, validation information, source information, destination information, indicators, tickets, and so forth.

The computing device 1000 additionally includes a data store 1008 (e.g., data repository) that is accessible by the processor 1002 by way of the system bus 1006. The data store 1008 may include executable instructions, logs, validation information, source information, destination information, indicators, tickets, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Figure 11:
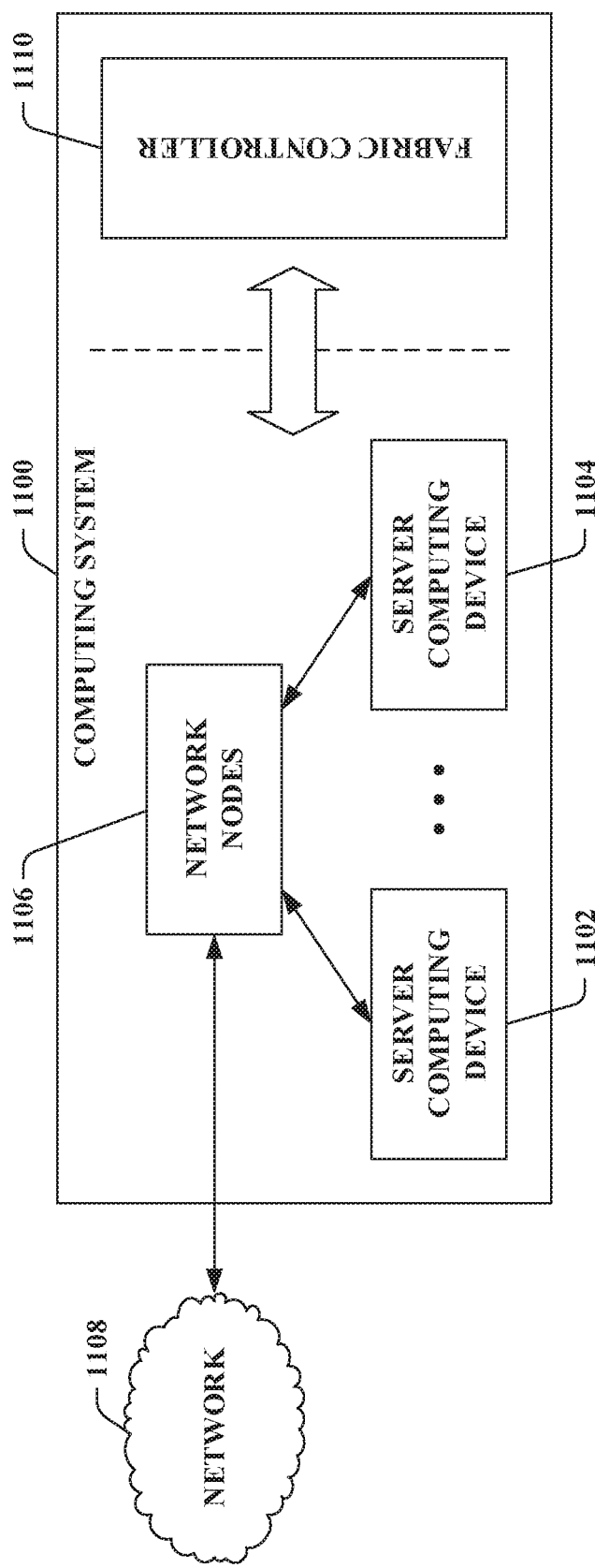
FIG. 11 illustrates an exemplary computing system.

Turning to FIG. 11, a high-level illustration of an exemplary computing system 1100 that can be used in accordance with the systems and methodologies disclosed herein is illustrated. For instance, the computing system 1100 can be or include the computing system 102. Additionally or alternatively, the computing system 102 can be or include the computing system 1100.

The computing system 1100 includes a plurality of server computing devices, namely, a server computing device 1102, . . . , and a server computing device 1104 (collectively referred to as server computing devices 1102-1104). The server computing device 1102 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1102, at least a subset of the server computing devices 1102-1104 other than the server computing device 1102 each respectively include at least one processor and a memory. Moreover, at least a subset of the server computing devices 1102-1104 include respective data stores.

Processor(s) of one or more of the server computing devices 1102-1104 can be or include the processor 112. Further, a memory (or memories) of one or more of the server computing devices 1102-1104 can be or include the memory 114. Moreover, a data store (or data stores) of one or more of the server computing devices 1102-1104 can be or include the data repository 402.

The computing system 1100 further includes various network nodes 1106 that transport data between the server computing devices 1102-1104. Moreover, the network nodes 1102 transport data from the server computing devices 1102-1104 to external nodes (e.g., external to the computing system 1100) by way of a network 1108. The network nodes 1102 also transport data to the server computing devices 1102-1104 from the external nodes by way of the network 1108. The network 1108, for example, can be the Internet, a cellular network, or the like. The network nodes 1106 include switches, routers, load balancers, and so forth.

A fabric controller 1110 of the computing system 1100 manages hardware resources of the server computing devices 1102-1104 (e.g., processors, memories, data stores, etc. of the server computing devices 1102-1104). The fabric controller 1110 further manages the network nodes 1106. Moreover, the fabric controller 1110 manages creation, provisioning, de-provisioning, and supervising of virtual machines instantiated upon the server computing devices 1102-1104.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling a migration of a source endpoint in a source telephony system to a destination endpoint in a destination telephony system, the method performed by a computing system that comprises at least one processor and memory, the memory comprises computer executable instructions that, when executed by the at least one processor, cause the processor to perform the method, the method comprising:
retrieving source information from the source telephony system based on a source indicator, the source information specifying a state of the source endpoint in the source telephony system;
retrieving destination information from the destination telephony system based on a destination indicator, the destination information specifying a state of the destination endpoint in the destination telephony system;
validating whether the source endpoint in the source telephony system is migratable to the destination endpoint in the destination telephony system based on the state of the source endpoint in the source telephony system and the state of the destination endpoint in the destination telephony system; and
subsequent to validating that the source endpoint in the source telephony system is migratable to the destination endpoint in the destination telephony system, performing the migration of the source endpoint in the source telephony system to the destination endpoint in the destination telephony system;
wherein the source endpoint in the source telephony system is activated prior to the migration and deactivated subsequent to the migration such that the source endpoint is configured to receive phone calls prior to the migration, and the destination endpoint in the destination telephony system is provisioned and non-active prior to the migration and activated subsequent to the migration such that the destination endpoint is configured to receive phone calls subsequent to the migration.

2. The method of claim 1, further comprising:
receiving, at the computing system, at least one of the source indicator or the destination indicator from a client computing device; and
transmitting, to the client computing device from the computing system, at least a portion of the source information and at least a portion of the destination information for display by the client computing device.

3. The method of claim 2, further comprising:
subsequent to validating that the source endpoint in the source telephony system is migratable to the destination endpoint in the destination telephony system, receiving a command at the computing system from the client computing device to perform the migration; and
responsive to receiving the command at the computing system from the client computing device, initiating the performing of the migration of the source endpoint in the source telephony system to the destination endpoint in the destination telephony system.

4. The method of claim 1, wherein at least one of the source indicator or the destination indicator is received from the destination endpoint as part of self-activation of the destination endpoint in the destination telephony system.

5. The method of claim 1, further comprising:
until the source endpoint in the source telephony system is validated to be migratable to the destination endpoint in the destination telephony system, disabling an ability to perform the migration.

6. The method of claim 1, performing the migration of the source endpoint in the source telephony system to the destination endpoint in the destination telephony system further comprises:
deactivating the source endpoint in the source telephony system; and
activating the destination endpoint in the destination telephony system.

7. The method of claim 1, performing the migration of the source endpoint in the source telephony system to the destination endpoint in the destination telephony system further comprises:
configuring an ancillary account assigned to the destination endpoint.

8. The method of claim 1, wherein:
the source indicator identifies at least one of:
the source endpoint;
a source extension assigned to the source endpoint in the source telephony system; or
a source user profile configured for the source endpoint in the source telephony system; and
the destination indicator identifies at least one of:
the destination endpoint;
a destination extension assigned to the destination endpoint in the destination telephony system; or
a destination user profile configured for the destination endpoint in the destination telephony system.

9. The method of claim 1, further comprising:
subsequent to performing the migration:
causing a one-sided, two-way phone call test to be performed for the destination endpoint; and
tracking results of the one-sided, two-way phone call test for the destination endpoint.

10. The method of claim 1, wherein:
validating whether the source endpoint in the source telephony system is migratable to the destination endpoint in the destination telephony system prior to the migration further comprises evaluating whether conditions for the migration are satisfied based on the state of the source endpoint in the source telephony system and the state of the destination endpoint in the destination telephony system; and
the method further comprises enabling an ability to perform the migration when the conditions are identified as being satisfied.

11. The method of claim 10, further comprising:
when a particular condition is identified as being unsatisfied:
dynamically altering the migration to be performed such that the particular condition is satisfied as part of the migration; and
enabling an ability to perform the migration as altered.

12. The method of claim 10, further comprising:
when a particular condition is identified as being unsatisfied:
creating a ticket in a case management system; and linking the ticket to a log, the log comprises the source information, the destination information, and information describing executed transactions.

13. The method of claim 12, further comprising:
continuing to disable the ability to perform the migration based on the particular condition being identified as unsatisfied.

14. The method of claim 1, further comprising at least one of:
managing concurrency of access to the source telephony system; or
managing concurrency of access to the destination telephony system.

15. The method of claim 1, wherein:
the source telephony system is selected from a plurality of supported source telephony systems; and
the destination telephony system is selected from a plurality of supported destination telephony systems.

16. A computing system, comprising:
at least one processor; and
memory that comprises computer-executable instructions that, when executed by the at least one processor, cause the at least one processor to perform acts including:
retrieving source information from a source telephony system based on a source indicator, the source information specifying a state of a source endpoint in the source telephony system;
retrieving destination information from a destination telephony system based on a destination indicator, the destination information specifying a state of a destination endpoint in the destination telephony system;
validating whether the source endpoint in the source telephony system is migratable to the destination endpoint in the destination telephony system based on the source information and the destination information; and
subsequent to validating that the source endpoint in the source telephony system is migratable to the destination endpoint in the destination telephony system, performing a migration of the source endpoint in the source telephony system to the destination endpoint in the destination telephony system;
wherein the source endpoint in the source telephony system is activated prior to the migration and deactivated subsequent to the migration, and the destination endpoint in the destination telephony system is provisioned and non-active prior to the migration and activated subsequent to the migration.

17. The computing system of claim 16, further comprising:
at least one data repository, the at least one data repository comprises a log;
wherein the memory further comprises computer-executable instructions that, when executed by the at least one processor, cause the at least one processor to perform acts including:
storing the source information, the destination information, and information describing executed transactions in the log.

18. The computing system of claim 17, the memory further comprises computer-executable instructions that, when executed by the at least one processor, cause the at least one processor to perform acts including:
creating a ticket in a case management system; and
linking the ticket to the log.

19. The computing system of claim 17, the memory further comprises computer-executable instructions that, when executed by the at least one processor, cause the at least one processor to perform acts including:
re-executing one or more of the executed transactions described by the information stored in the log, wherein the one or more of the executed transactions are part of the migration, and the one or more of the executed transactions are re-executed responsive to a selection from the log.

20. A method of operating a client computing device to cause a migration of a source endpoint in a source telephony system to a destination endpoint in a destination telephony system, comprising:
responsive to receipt of a first user input at the client computing device, transmitting an indicator to a computing system, the indicator being based on the first user input, the indicator pertaining to at least one of the source endpoint or the destination endpoint;
receiving validation information from the computing system, the validation information specifies whether the source endpoint in the source telephony system is validated to be migratable to the destination endpoint in the destination telephony system;
causing the validation information to be displayed on a display screen; and
when and only when the validation information specifies that the source endpoint is validated to be migratable to the destination endpoint:
responsive to receipt of a second user input at the client computing device, transmitting a command to the computing system, wherein the command causes the computing system to perform the migration of the source endpoint in the source telephony system to the destination endpoint in the destination telephony system.

21. The method of claim 20, further comprising:
subsequent to the migration of the source endpoint in the source telephony system to the destination endpoint in the destination telephony system:
responsive to receipt of a third user input at the client computing device, causing performance of a one-sided, two-way phone call test for the destination endpoint.

* * * * *